United States Patent Office 3,394,147
Patented July 23, 1968

---

3,394,147
**CYCLIC SULFITE ESTERS OF POLYCHLORO-
PROPYLENE GLYCOLS**
Herwart C. Vogt, Grosse Ile, and Pauls Davis, Gibraltar,
Mich., assignors to Wyandotte Chemicals Corporation,
Wyandotte, Mich., a corporation of Michigan
No Drawing. Filed May 6, 1966, Ser. No. 548,045
1 Claim. (Cl. 260—327)

The present invention relates to novel stable cyclic sulfite esters of polychloropropylene glycols and to a process for their preparation. More particularly, the invention relates to esters prepared by the reaction of 3,3,3-trichloropropylene glycol or 3,3-dichloropropylene glycol with thionyl chloride. These novel esters possess excellent pesticidal activity.

The novel esters of the present invention may be represented by the following formula:

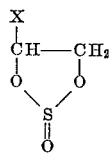

wherein X is $CCl_3$ or $CHCl_2$. As is apparent from the above formula, the novel cyclic esters of the present invention are characterized by a pendant polychlorogenous alkyl group. The esters of the present invention are surprisingly stable compounds, thus affording utility in a number of pesticidal applications. For example, the ester prepared from 3,3,3-trichloropropylene glycol remains stable at temperatures up to 200° C.

As mentioned above, the cyclic esters of the present invention are prepared by the reaction of 3,3,3-trichloropropylene glycol or 3,3-dichloropropylene glycol with thionyl chloride. The reaction occurs with the evolution of hydrogen chloride. The esters are generally prepared by slowly adding the thionyl chloride to the glycol. Since the reaction readily occurs, the temperature of the reaction is generally maintained at about 0° C. to 25° C. during the thionyl chloride addition. After this addition, the reaction is completed by heating the reaction mixture to about 80° C. to 150° C. for about one-half to two hours. The esters of the present invention are generally prepared by the reaction of stoichiometrically equivalent amounts of reactants, although excess amounts of either reactant may be employed.

The following examples illustrate the nature of the invention. All parts are by weight unless otherwise stated.

Example I

A reaction vessel equipped with stirrer, thermometer, inlet and outlet valves and heat exchange means was charged with 180 parts of trichloropropylene glycol. The glycol was cooled to about 10° C. and 119 parts of thionyl chloride wass added gradually with constant agitation while maintaining the temperature of the charge at about 10° C. Hydrogen chloride evolution began immediately upon the thionyl chloride addition. Upon completion of the thionyl chloride addition, the reaction mixture was heated to 100° C. to 120° C. for thirty minutes. The heterocyclic product obtained, trichloromethylethylene sulfite, 208 parts (100% of theory), boiled at 68° C. at eight millimeters of mercury and recorded an $n_D^{25}$ of 1.5500. The infrared spectrum confirmed the presence of C=Cl, S, O, $CH_2$ and S=O structures. Analysis indicated 14.6% S and 48.3% Cl as compared with theoretical values of 14.2% S and 47.2% Cl. Saponification of the ester with anhydrous potassium hydroxide resulted in a quantitative yield of the starting glycol.

Example II

A vessel equipped as in Example I is charged with 150 parts of 3,3-dichloropropylene glycol. The charge is cooled to about 15° C. and 119 parts of thionyl chloride is added gradually while maintaining the temperature of the reaction mixture at about 15° C. Upon completion of the thionyl chloride addition, the reaction mixture is heated to about 110° C. to 130° C. for about one hour. Analysis indicated the product obtained is the heretocyclic sulfite ester of 3,3-dichloropropylene glycol (dichloromethylethylene sulfite). Saponification of the product results in a quantitative yield of the starting glycol.

The esters prepared in Example I and Example II may be employed as insecticides, fungicides and herbicides. Following the standard procedures for testing pesticidal candidates, these compounds exhibit excellent over-all pesticidal activity.

What is claimed is:
1. A cyclic sulfite ester of the formula

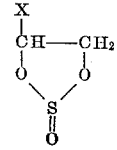

wherein X is $CCl_3$ or $CHCl_2$.

References Cited

De La Mare et al., Chem. Abstracts, vol. 51 (1957), pp. 1035–6.
Ben-Ishai, Chem. Abstracts, vol. 53 (1959), pp. 18047–8.

JAMES A. PATTEN, *Primary Examiner.*